US008058376B2

(12) United States Patent
Aten et al.

(10) Patent No.: US 8,058,376 B2
(45) Date of Patent: Nov. 15, 2011

(54) FLUOROPOLYMER PRODUCED BY AQUEOUS POLYMERIZATION USING DISPERSED PARTICULATE OF FLUORINATED LONOMER PRODUCED IN SITU

(75) Inventors: Ralph Munson Aten, Chadds Ford, PA (US); Kenneth Wayne Leffew, Kennett Square, PA (US); Ralph Birchard Lloyd, Fayetteville, NC (US); Charles Joseph Noelke, Pinehurst, NC (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/641,374

(22) Filed: Dec. 18, 2009

(65) Prior Publication Data
US 2010/0160510 A1 Jun. 24, 2010

Related U.S. Application Data

(60) Provisional application No. 61/140,118, filed on Dec. 23, 2008.

(51) Int. Cl.
*C08F 14/18* (2006.01)
*C08F 259/08* (2006.01)

(52) U.S. Cl. ........ 526/242; 526/201; 526/203; 526/243; 524/457

(58) Field of Classification Search .................. 524/457; 526/201, 203, 242, 243
See application file for complete search history.

(56) References Cited

U.S. PATENT DOCUMENTS

| | | |
|---|---|---|
| 2,559,752 A | 7/1951 | Berry |
| 2,713,593 A | 7/1955 | Brice et al. |
| 3,037,953 A | 6/1962 | Marks et al. |
| 3,271,341 A | 9/1966 | Garrison, Jr. et al. |
| 3,282,875 A | 11/1966 | Connolly et al. |
| 3,291,843 A | 12/1966 | Fritz et al. |
| 3,391,099 A | 7/1968 | Punderson |
| 3,704,272 A | 11/1972 | Holmes |
| 4,358,545 A | 11/1982 | Ezzell et al. |
| 4,380,618 A | 4/1983 | Khan et al. |
| 4,443,082 A | 4/1984 | Murano et al. |
| 4,552,631 A | 11/1985 | Bissot et al. |
| 4,621,116 A | 11/1986 | Morgan |
| 4,743,658 A | 5/1988 | Imbalzano et al. |
| 4,940,525 A | 7/1990 | Ezzell et al. |
| 4,952,630 A | 8/1990 | Morgan et al. |
| 5,422,411 A | 6/1995 | Wei et al. |
| 5,637,748 A | 6/1997 | Hung et al. |
| 5,688,884 A | 11/1997 | Baker et al. |
| 5,763,552 A | 6/1998 | Feiring et al. |
| 5,789,508 A | 8/1998 | Baker et al. |
| 5,925,705 A | 7/1999 | Araki et al. |
| 6,153,688 A | 11/2000 | Miura et al. |
| 6,177,196 B1 | 1/2001 | Brothers et al. |
| 6,274,677 B1 * | 8/2001 | Tatemoto ..................... 525/276 |
| 6,300,445 B1 | 10/2001 | Hung et al. |
| 6,395,848 B1 | 5/2002 | Morgan et al. |
| 6,552,093 B1 | 4/2003 | Curtin et al. |
| 6,841,616 B2 | 1/2005 | Wille et al. |
| 7,071,271 B2 | 7/2006 | Thaler et al. |
| 7,166,685 B2 | 1/2007 | Curtin et al. |
| 2003/0023015 A1* | 1/2003 | Tatemoto et al. ............. 526/243 |
| 2003/0224235 A1 | 12/2003 | Park et al. |
| 2005/0043487 A1 | 2/2005 | Felix et al. |
| 2005/0090613 A1 | 4/2005 | Maruya et al. |
| 2005/0096442 A1* | 5/2005 | Thaler et al. .................. 526/255 |
| 2005/0119357 A1 | 6/2005 | Curtin et al. |
| 2006/0014887 A1 | 1/2006 | Hamrock et al. |
| 2006/0128872 A1 | 6/2006 | Zipplies et al. |
| 2006/0160947 A1 | 7/2006 | Tan et al. |
| 2006/0281946 A1 | 12/2006 | Morita et al. |
| 2007/0004848 A1* | 1/2007 | Hintzer et al. ................ 524/544 |
| 2007/0015864 A1 | 1/2007 | Hintzer et al. |
| 2007/0015865 A1 | 1/2007 | Hintzer et al. |
| 2007/0015866 A1 | 1/2007 | Hintzer et al. |
| 2007/0208131 A1* | 9/2007 | Tsuda et al. .................. 524/544 |

FOREIGN PATENT DOCUMENTS

| | | |
|---|---|---|
| EP | 0148482 B1 | 3/1992 |
| EP | 1 283 225 B1 | 5/2006 |
| GB | 1292268 | 10/1972 |
| JP | 2004075978 | 3/2004 |
| JP | 2004075978 A * | 3/2004 |
| JP | 2004358397 A | 12/2004 |
| JP | 2004359870 A | 12/2004 |
| WO | 0146116 A1 | 6/2001 |
| WO | 03059992 A1 | 7/2003 |
| WO | 2004067588 A1 | 8/2004 |
| WO | WO 2006/135825 A1 | 12/2006 |
| WO | 2007046345 A1 | 4/2007 |
| WO | 2007046377 A1 | 4/2007 |
| WO | 2007046482 A1 | 4/2007 |
| WO | 2007049517 A1 | 5/2007 |
| WO | 2008060463 A1 | 5/2008 |
| WO | 2009094344 A1 | 7/2009 |

OTHER PUBLICATIONS

Apostolo, Marco et al, "Properties of Fluoroelastomer/Semicrystalline Perfluoropolymer Nano-Blends", Journal of Fluorine Chemistry, 125 (2004) 303-314.

* cited by examiner

*Primary Examiner* — Kelechi Egwim

(57) ABSTRACT

A process for making an aqueous dispersion of fluoropolymer particles by polymerizing in a first polymerization step at least one fluorinated monomer having an ionic group in an aqueous polymerization medium in the presence of initiator, the polymerizing providing dispersed particulate of fluorinated ionomer, and polymerizing in a second polymerization step at least one fluorinated monomer in the aqueous polymerization medium in the presence of the dispersed particulate of fluorinated ionomer and initiator to form the aqueous dispersion of particles of fluoropolymer.

29 Claims, No Drawings

US 8,058,376 B2

FLUOROPOLYMER PRODUCED BY AQUEOUS POLYMERIZATION USING DISPERSED PARTICULATE OF FLUORINATED LONOMER PRODUCED IN SITU

FIELD OF THE INVENTION

This invention relates to a process for the dispersion polymerization of fluorinated monomer in an aqueous polymerization medium and fluoropolymer particles and aqueous dispersions made thereby.

BACKGROUND OF THE INVENTION

A typical process for the aqueous dispersion polymerization of fluorinated monomer includes feeding fluorinated monomer to a heated reactor containing a fluorosurfactant and deionized water. Paraffin wax is employed in the reactor as a stabilizer for some polymerizations, e.g., polytetrafluoroethylene (PTFE) homopolymers. A free-radical initiator solution is employed and, as the polymerization proceeds, additional fluorinated monomer is added to maintain the pressure. A chain transfer agent is employed in the polymerization of some polymers, e.g., melt-processible TFE copolymers, to control melt viscosity. After several hours, the feeds are stopped, the reactor is vented and purged with nitrogen, and the raw dispersion in the vessel is transferred to a cooling vessel.

For use in fluoropolymer coatings for metals, glass and fabric, polymer dispersion is typically transferred to a dispersion concentration operation which produces stabilized dispersions used as coatings. Certain grades of PTFE dispersion are made for the production of fine powder. For this use, the polymer dispersion is coagulated, the aqueous medium is removed and the PTFE is dried to produce fine powder. Dispersions of melt-processible fluoropolymers for molding resin are also coagulated and the coagulated polymer dried and then processed into a convenient form such as flake, chip or pellet for use in subsequent melt-processing operations.

As described in U.S. Pat. No. 3,391,099 to Punderson, dispersion polymerization involves two generally distinct phases. The initial period of the reaction is a nucleation phase in which a given number of polymerization sites or nuclei are established. Subsequently, there occurs a growth phase in which polymerization of fluorinated monomer on established particles occurs with little or no formation of new particles. Successful production of the high solids fluoropolymer dispersion generally requires the presence of the fluorosurfactant.

Fluorosurfactants used in the polymerization are usually anionic, non-telogenic, soluble in water and stable to reaction conditions. The most widely used fluorosurfactants are perfluoroalkane carboxylic acids and salts as disclosed in U.S. Pat. No. 2,559,752 to Berry, specifically perfluorooctanoic acid and salts, often referred to as C8, and perfluorononanoic acid and salts, often referred to as C9. Because of recent environmental concerns with regard to perfluorooctanoic acid and salts, there is interest in reducing or eliminating perfluoroalkane carboxylic acids and their salts in fluoropolymer polymerization processes.

SUMMARY OF THE INVENTION

The invention is based on the discovery that a process for making an aqueous dispersion of fluoropolymer particles is effectively carried out by polymerizing in a first polymerization step at least one fluorinated monomer having an ionic group in an aqueous polymerization medium in the presence of initiator, the polymerizing providing dispersed particulate of fluorinated ionomer, and polymerizing in a second polymerization step at least one fluorinated monomer in the aqueous polymerization medium in the presence of the dispersed particulate of fluorinated ionomer and initiator to form the aqueous dispersion of particles of fluoropolymer.

In one preferred form of the present invention, the amount of dispersed particulate of fluorinated ionomer present in the aqueous polymerization medium in the second polymerization step comprises less than about 15 wt % of the fluoropolymer solids produced in the aqueous dispersion. In another preferred form of the invention, the dispersed particulate of fluorinated ionomer has a weight average particle size of about 2 nm to about 100 nm. The fluorinated ionomer preferably has an ion exchange ratio of about 3 to about 53. In a preferred embodiment of the invention, the fluorinated ionomer is highly fluorinated, more preferably, perfluorinated.

In a preferred form of the invention, the process further comprises providing surfactant in the polymerization medium. Preferably, the surfactant comprises fluorosurfactant, more preferably, fluoroether surfactant.

DETAILED DESCRIPTION OF THE INVENTION

Fluorinated Ionomer

Particulate of fluorinated ionomer is polymerized in the first polymerization step process in accordance with the present invention. "Fluorinated Ionomer" means a fluoropolymer having sufficient ionic groups to provide an ion exchange ratio of no greater than about 53. In this application, "ion exchange ratio" or "IXR" is defined as number of carbon atoms in the polymer backbone in relation to the ionic groups. Precursor groups such as —$SO_2F$ which upon hydrolysis become ionic are not treated as ionic groups for the purposes of determining IXR. The fluorinated ionomer employed in the process of the invention preferably has an ion exchange ratio of about 3 to about 53. More preferably, the IXR is about 3 to about 43, even more preferably about 3 to about 33, still more preferably about 8 to about 33, most preferably 8 to about 23. In a preferred embodiment, the fluorinated ionomer is highly fluorinated. "Highly fluorinated" in reference to ionomer means that at least 90% of the total number of univalent atoms bonded to carbon atoms in the polymer are fluorine atoms. Most preferably, the ionomer is perfluorinated.

In fluorinated ionomers, the ionic groups are typically distributed along the polymer backbone. Preferably, the fluorinated ionomer comprises a polymer backbone with recurring side chains attached to the backbone with the side chains carrying the ionic groups. Preferred fluorinated ionomer comprises ionic groups having a pKa less than about 10, more preferably, less than about 7. Ionic groups of the polymer are preferably selected from the group consisting of sulfonate, carboxylate, phosphonate, phosphate, and mixtures thereof. The terms "sulfonate, carboxylate, phosphonate and phosphate" are intended to refer to either the respective salts or respective acids from which salts can be formed. Preferably, when salts are employed, the salts are alkali metal or ammonium salts. Preferred ionic groups are sulfonate groups. Sulfonate groups in preferred fluorinated ionomers used in the process of the invention have a pKa of about 1.9 as measured on the fluorinated ionomer in aqueous dispersion form having 10 wt % solids at room temperature.

Provided that the dispersed fluorinated ionomer particulate can be polymerized in situ, various known fluorinated ionomers can be used including polymers and copolymers of trifluoroethylene, tetrafluoroethylene (TFE), α,β,β-trifluorostyrene, etc., which contain ionic groups. Possible polymers include homopolymers or copolymers of two or more monomers. Copolymers are typically formed from one monomer which is a nonfunctional monomer and which provides carbon atoms for the polymer backbone. A second monomer provides both carbon atoms for the polymer backbone and also contributes the side chain carrying the ionic group, e.g., a sulfonate functional group. For example, copolymers of a first fluorinated vinyl monomer together with a second fluorinated vinyl monomer having a sulfonate functional group can be used. Possible first monomers include tetrafluoroethylene (TFE), hexafluoropropylene, vinyl fluoride, vinylidine fluoride, trifluoroethylene, chlorotrifluoroethylene, perfluoro (alkyl vinyl ether), and mixtures thereof. Possible second monomers include a variety of fluorinated vinyl ethers with ionic groups which can provide the desired side chain in the polymer. The first monomer may also have a side chain. Additional monomers can also be incorporated into these polymers if desired.

A class of preferred ionomers for use in the present invention includes a highly fluorinated, most preferably perfluorinated, carbon backbone and the side chain is represented by the formula —(O—CF$_2$CFR$_f$)$_a$—(O—CF$_2$)$_b$—(CFR'$_f$)$_c$SO$_3$X, wherein R$_f$ and R'$_f$ are independently selected from F, Cl or a perfluorinated alkyl group having 1 to 10 carbon atoms, a=0 to 2, b=0 to 1, c=0 to 6, and X is H, Li, Na, K or NH$_4$. The preferred ionomers include, for example, polymers disclosed in U.S. Pat. No. 3,282,875 and in U.S. Pat. Nos. 4,358,545 and 4,940,525. One preferred ionomer comprises a perfluorocarbon backbone and the side chain is represented by the formula —O—CF$_2$CF(CF$_3$)—O—CF$_2$CF$_2$SO$_3$X, wherein X is as defined above. Ionomers of this type are disclosed in U.S. Pat. No. 3,282,875. Such ionomers can be made by copolymerization of tetrafluoroethylene (TFE) and the perfluorinated vinyl ether CF$_2$=CF—O—CF$_2$CF(CF$_3$)—O—CF$_2$CF$_2$SO$_3$X, perfluoro(3,6-dioxa-4-methyl-7-octenesulfonate) (PDMOS). One preferred ionomer of the type disclosed in U.S. Pat. Nos. 4,358,545 and 4,940,525 has the side chain —O—CF$_2$CF$_2$SO$_3$X, wherein X is as defined above. This ionomer can be made by copolymerization of tetrafluoroethylene (TFE) and the perfluorinated vinyl ether CF$_2$=CF—O—CF$_2$CF$_2$SO$_3$X, perfluoro(3-oxa-4-pentenesulfonate) (POPS).

For ionomers of this type, the cation exchange capacity of a polymer is often expressed in terms of equivalent weight (EW). For the purposes of this application, equivalent weight (EW) is defined to be the weight of the ionomer in acid form required to neutralize one equivalent of NaOH. In the case of a sulfonate ionomer where the ionomer comprises a perfluorocarbon backbone and the side chain is —O—CF$_2$—CF(CF$_3$)—O—CF$_2$—CF$_2$—SO$_3$H (or a salt thereof), the equivalent weight range which corresponds to an IXR of about 8 to about 23 is about 750 EW to about 1500 EW. IXR for this ionomer can be related to equivalent weight using the following formula: 50IXR+344=EW. While generally the same IXR range is used for sulfonate ionomers disclosed in U.S. Pat. Nos. 4,358,545 and 4,940,525, e.g., the ionomer having the side chain —O—CF$_2$CF$_2$SO$_3$H (or a salt thereof), the equivalent weight is somewhat lower because of the lower molecular weight of the monomer unit containing the ionic group. For the preferred IXR range of about 8 to about 23, the corresponding equivalent weight range is about 575 EW to about 1325 EW. IXR for this polymer can be related to equivalent weight using the following formula: 50 IXR+178=EW.

The molecular weight of the fluorinated ionomer particulate produced in the first polymerization step can generally be in the same range as the resin which is used in ion exchange polymer membranes used in the chloralkali process for the electrolytic production of chlorine and sodium hydroxide from sodium chloride and in fuel cells. Such fluorinated ionomer resin has a molecular weight which preferably provides solid fluorinated ionomer particulate at room temperature. In thermoplastic forms of the fluorinated ion exchange polymer, melt flow rate is preferably in the range of 1 to about 500, more preferably about 5 to about 50, most preferably about 10 to about 35 g/10 min.

The fluorinated ionomer particulate of the dispersion produced in the first polymerization step of the process of the invention preferably has a weight average particle size of about 2 nm to about 100 nm. More preferably, such particulate has a weight average particle size of about 2 to about 50 nm, even more preferably about 2 to about 30, still more preferably about 2 to about 10 nm.

The weight average particle size in a liquid dispersion of fluorinated ionomer particulate used in accordance with the invention can be measured by a dynamic light scattering (DLS) technique as described below in the Test Methods.

Additional detail concerning the first polymerization step to produce in situ dispersed fluorinated ionomer particulate possessing properties desirable for use in accordance with the invention is provided in the description of the process below.

Fluoropolymer

"Fluoropolymer" means polymer polymerized from at least one fluorinated monomer and which polymer has no measureable ionic groups, or a limited number of ionic groups providing an ion exchange ratio of greater than about 53, i.e., is nonionomeric fluoropolymer. Precursor groups such as —SO$_2$F which upon hydrolysis become ionic are not treated as ionic groups for the purposes of determining IXR. Preferred fluoropolymers have no ionic groups, or a limited number of ionic groups providing an ion exchange ratio of greater than about 100. The fluorinated monomer used in the process of this invention is preferably independently selected from the group consisting of tetrafluoroethylene (TFE), hexafluoropropylene (HFP), chlorotrifluoroethylene (CTFE), trifluoroethylene, hexafluoroisobutylene, perfluoroalkyl ethylene, fluorovinyl ethers, vinyl fluoride (VF), vinylidene fluoride (VF2), perfluoro-2,2-dimethyl-1,3-dioxole (PDD), perfluoro-2-methylene-4-methyl-1,3-dioxolane (PMD), perfluoro(allyl vinyl ether) and perfluoro(butenyl vinyl ether). A preferred perfluoroalkyl ethylene monomer is perfluorobutyl ethylene (PFBE). Preferred fluorovinyl ethers include perfluoro(alkyl vinyl ether) monomers (PAVE) such as perfluoro(propyl vinyl ether) (PPVE), perfluoro(ethyl vinyl ether) (PEVE), and perfluoro(methyl vinyl ether) (PMVE). Non-fluorinated olefinic comonomers such as ethylene and propylene can be copolymerized with fluorinated monomers.

Fluorovinyl ethers also include those useful for introducing functionality into fluoropolymers. In one embodiment of the invention, fluorovinyl ether monomers are employed in polymerization which introduce functional groups which are precursors for ionic groups. These include CF$_2$=CF—(O—CF$_2$CFR$_f$)$_a$—O—CF$_2$CFR'$_f$SO$_2$F, wherein R$_f$ and R'$_f$ are independently selected from F, Cl or a perfluorinated alkyl group having 1 to 10 carbon atoms, a=0, 1 or 2. Polymers of this type are disclosed in U.S. Pat. No. 3,282,875 (CF$_2$=CF—O—CF$_2$CF(CF$_3$)—O—CF$_2$CF$_2$SO$_2$F, perfluoro(3,6-dioxa-4-methyl-7-octenesulfonyl fluoride)), and in U.S. Pat. Nos. 4,358,545 and 4,940,525 (CF$_2$=CF—O—

$CF_2CF_2SO_2F$). Another example is $CF_2=CF-O-CF_2-CF(CF_3)-O-CF_2CF_2CO_2CH_3$, methyl ester of perfluoro (4,7-dioxa-5-methyl-8-nonenecarboxylic acid), disclosed in U.S. Pat. No. 4,552,631. Functional groups in fluoropolymers incorporating such monomers can be hydrolyzed by known methods after polymerization to form ionic groups. Although it is intended that the unhydrolyzed polymer be considered a fluoropolymer for the purposes of polymerization in accordance with the invention and within the scope of the claims, after polymerization such polymers may become fluorinated ionomer if upon hydrolysis such ionic groups are present in sufficient quantity to provide an IXR of no greater than about 53. Other fluorovinyl ethers with functionality of nitrile, cyanate, carbamate, and phosphoric acid are disclosed in U.S. Pat. Nos. 5,637,748; 6,300,445; and 6,177,196.

The invention is especially useful when producing dispersions of polytetrafluoroethylene (PTFE) particles including modified PTFE. PTFE and modified PTFE typically have a melt creep viscosity of at least about $1 \times 10^8$ Pa·s and, with such high melt viscosity, the polymer does not flow significantly in the molten state and therefore is not a melt-processible polymer. Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 wt %, more preferably less than 0.5 wt %. A minimum amount of at least about 0.05 wt % is preferably used to have significant effect. The modified PTFE contains a small amount of comonomer modifier which improves film forming capability during baking (fusing), such as perfluoroolefin, notably hexafluoropropylene (HFP) or perfluoro(alkyl vinyl ether) (PAVE), where the alkyl group contains 1 to 5 carbon atoms, with perfluoro(ethyl vinyl ether) (PEVE) and perfluoro(propyl vinyl ether) (PPVE) being preferred. Chlorotrifluoroethylene (CTFE), perfluorobutyl ethylene (PFBE), or other monomer that introduces bulky side groups into the molecule are also included.

The invention is especially useful when producing dispersions of melt-processible fluoropolymer particles. By melt-processible, it is meant that the polymer can be processed in the molten state (i.e., fabricated from the melt into shaped articles such as films, fibers, and tubes etc. that exhibit sufficient strength and toughness to be useful for their intended purpose) using conventional processing equipment such as extruders and injection molding machines. Examples of such melt-processible fluoropolymers include homopolymers such as polychlorotrifluoroethylene or copolymers of tetrafluoroethylene (TFE) and at least one fluorinated copolymerizable monomer (comonomer) present in the polymer usually in sufficient amount to reduce the melting point of the copolymer substantially below that of TFE homopolymer, polytetrafluoroethylene (PTFE), e.g., to a melting temperature no greater than about 315° C.

A melt-processible TFE copolymer typically incorporates an amount of comonomer into the copolymer in order to provide a copolymer which has a melt flow rate (MFR) of about 1-100 g/10 min as measured according to ASTM D-1238 at the temperature which is standard for the specific copolymer. Preferably, the melt viscosity is at least about $10^2$ Pa·s, more preferably, will range from about $10^2$ Pa·s to about $10^6$ Pa·s, most preferably about $10^3$ to about $10^5$ Pa·s measured at 372° C. by the method of ASTM D-1238 modified as described in U.S. Pat. No. 4,380,618. Additional melt-processible fluoropolymers are the copolymers of ethylene (E) or propylene (P) with TFE or CTFE, notably ETFE, ECTFE and PCTFE.

A preferred melt-processible copolymer formed in the practice of the present invention comprises at least about 60-98 wt % tetrafluoroethylene units and about 2-40 wt % of at least one other monomer. Preferred comonomers with TFE are perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE, MFA (TFE/PMVE/PAVE wherein the alkyl group of PAVE has at least two carbon atoms) and THV (TFE/HFP/VF2).

Further useful polymers are film forming polymers of polyvinylidene fluoride (PVDF) and copolymers of vinylidene fluoride as well as polyvinyl fluoride (PVF) and copolymers of vinyl fluoride.

The invention is also useful when producing dispersions of fluorocarbon elastomer particles. These elastomers typically have a glass transition temperature below 25° C. and exhibit little or no crystallinity, i.e. they are amorphous at room temperature. In one embodiment of the present invention, fluorocarbon elastomer copolymers made by of the process contain 25 to 70 wt %, based on total weight of the fluorocarbon elastomer, of copolymerized units of a first fluorinated monomer which may be vinylidene fluoride (VF2) or tetrafluoroethylene (TFE) or mixtures thereof. The remaining units in the fluorocarbon elastomers are comprised of one or more additional copolymerized monomers, different from the first monomer, selected from the group consisting of fluorinated monomers, hydrocarbon olefins and mixtures thereof. Fluorocarbon elastomers prepared by the process of the present invention may also, optionally, comprise units of one or more cure site monomers. When present, copolymerized cure site monomers are typically at a level of 0.05 to 7 wt %, based on total weight of fluorocarbon elastomer. Examples of suitable cure site monomers include: i) bromine-, iodine-, or chlorine-containing fluorinated olefins or fluorinated vinyl ethers; ii) nitrile group-containing fluorinated olefins or fluorinated vinyl ethers; iii) perfluoro(2-phenoxypropyl vinyl ether); and iv) non-conjugated dienes.

Preferred TFE based fluorocarbon elastomer copolymers include TFE/PMVE, TFE/PMVE/E, TFE/P and TFE/P/VF2. Preferred VF2 based fluorocarbon elastomer copolymers include VF2/HFP, VF2/HFP/TFE, and VF2/PMVE/TFE. Any of these elastomer copolymers may further comprise units of cure site monomer.

Surfactant

In addition to a dispersion of fluorinated ionomer particulate, the aqueous polymerization medium used to form the aqueous dispersion of particles of fluoropolymers may further comprise surfactant. The surfactant can be selected from a large group of suitable surfactants including hydrocarbon surfactants, siloxane surfactants, and fluorosurfactants. Suitable hydrocarbon surfactants have been disclosed in U.S. Pat. No. 5,925,705 to Araki et al; and JP Patent Publications 2004/358397 and 2004/359870 to Tsuda et al. Suitable siloxane surfactants have been described in U.S. Pat. No. 6,841,616 to Wille et al. Preferably the surfactant is a fluorosurfactant and more preferably is a fluoroether surfactant.

Examples of fluorosurfactants that may be a component of the polymerization agent are described in U.S. Pat. No. 6,395, 848 to Morgan et al. as fluoroalkyl having at most one ether oxygen, preferably perfluoroalkyl, carboxylic acids and salts thereof having 6-20 carbon atoms, preferably 6-12 carbon atoms, such as ammonium perfluorooctanoate and ammonium perfluorononanoate (see Berry, U.S. Pat. No. 2,559,752). Perfluoroalkyl sulfonic acids and salt may also be used. In one embodiment of the invention, perfluoroalkyl ethane sulfonic acids and salts thereof are employed, preferably a compound or a mixture of compounds of the formula F—($CF_2$—$CF_2$—)$_n$—$CH_2CH_2$—$SO_3M$, wherein n is 2-8 and M is a cation having a valence of 1 as described in Khan & Morgan, U.S. Pat. No. 4,380,618. More preferably, such perfluoroalkyl ethane sulfonic acid surfactant comprises a compound of the formula $C_6F_{13}$—$CH_2CH_2$—$SO_3M$, wherein M is a cation having a valence of 1 as described in Baker & Zipfel, U.S. Pat. Nos. 5,688,884 and 5,789,508. Preferably, M in the above formula is $NH_4^+$.

Additional examples of such fluorosurfactants include perfluoroalkoxy benzene sulfonic acids and salts thereof wherein the perfluoroalkyl component of the perfluoroalkoxy has 4-12 carbon atoms, preferably 7-12 carbon atoms (as described in Morgan, U.S. Pat. No. 4,621,116). Additional examples of such surfactants also include partially-fluorinated surfactants having internal methylene groups and having the formula $R_f$—$(CH_2)_m$—$R'_f$—COOM wherein m is 1-3, $R_f$ is perfluoroalkyl or perfluoroalkoxy containing 3-8 carbon atoms, $R'_f$ is linear or branched perfluoroalkylene containing 1-4 carbon atoms, and M is $NH_4$, Li, Na, K, or H (as described in Feiring et al., U.S. Pat. No. 5,763,552).

Examples of suitable fluoroether surfactants have been described in U.S. Pat. No. 3,271,341 to Garrison; U.S. Patent Publications 2007/0015864, 2007/0015865, and 2007/0015866 to Hintzer et al.; U.S. Patent Publications 2005/0090613 to Maruya et al. and 2006/0281946 to Morita et al.; PCT Patent Publications WO 2007046345 to Higuchi et al., 2007046377 to Funaki et al., 2007046482 to Hoshikawa et al., and 2007/049517 to Matsuoka et al.

In accordance with a preferred embodiment of the invention, the aqueous medium comprises less than about 300 ppm of perfluoroalkane carboxylic acid or salt fluorosurfactants having 8 or more carbon atoms, based on the weight of water in the aqueous medium. Perfluoroalkane acid or salt fluorosurfactants having 8 or more carbon atoms include such surfactants having for example 8-14 carbon atoms, e.g., perfluorooctanoic acid and salts and perfluorononanoic acid and salts. More preferably, the aqueous medium comprises less than about 100 ppm of perfluoroalkane carboxylic acid or salt fluorosurfactants having 8 or more carbon atoms, more preferably less than 50 ppm. In a preferred embodiment of the invention, the aqueous medium is substantially free of perfluoroalkane carboxylic acid or salt fluorosurfactants having 8 or more carbon atoms. Substantially free of perfluoroalkane carboxylic acid or salt fluorosurfactants having 8 or more carbon atoms means that aqueous medium contains no more than about 10 ppm of such fluorosurfactants.

In a preferred embodiment the aqueous polymerization medium contains a short chain fluorosurfactant having the formula:

$$[R^1—O_n-L-A^-]Y^+ \quad (I)$$

wherein:
$R^1$ is a linear or branched partially or fully fluorinated aliphatic group which may contain ether linkages;
n is 0 or 1;
L is a linear or branched alkylene group which may be nonfluorinated, partially fluorinated or fully fluorinated and which may contain ether linkages;

$A^-$ is an anionic group selected from the group consisting of carboxylate, sulfonate, sulfonamide anion, and phosphonate; and
$Y^+$ is hydrogen, ammonium or alkali metal cation;
with the proviso that the chain length of $R^1$—$O_n$-L- is not greater than 6 atoms.

"Chain length" as used in this application refers to the number of atoms in the longest linear chain in the hydrophobic tail of the fluorosurfactant employed in the process of this invention. Chain length includes atoms such as oxygen atoms in addition to carbon in the chain of the hydrophobic tail of the surfactant but does not include branches off of the longest linear chain or include atoms of the anionic group, e.g., does not include the carbon in carboxylate. "Short chain" as used in this application refers to a chain length of not greater than 6. "Long chain" refers to a chain length of greater than 6, e.g., fluorosurfactants having a chain length of 7 to 14 atoms.

Preferably, the chain length of $R^1$—$O_n$-L- is 3 to 6 atoms. In accordance with one preferred form of the invention the chain length of $R^1$—$O_n$-L- is 4 to 6 atoms. In accordance with another preferred form of the invention the chain length of $R^1$—$O_n$-L- is 3 to 5 atoms. Most preferably, the chain length of $R^1$—$O_n$-L- is 4 to 5 atoms.

A preferred class of fluorosurfactants is short chain fluoroether acids or salts, i.e., wherein n is 1 in Formula (I) above. Preferred fluoroether acids or salts in accordance with the invention are fluorosurfactants according to Formula (I) wherein:
$R^1$ is a linear or branched partially or fully fluorinated alkyl group having 1 to 3 carbon atoms which may contain ether linkages; and
L is an alkylene group selected from —$CX(R^2)$—, wherein $R^2$ is fluorine or perfluoromethyl and X is hydrogen or fluorine, and —$CZ^1Z^2CZ^3Z^4$—, wherein $Z^1$, $Z^2$, $Z^3$, and $Z^4$ are independently selected from hydrogen or fluorine.

Fluoroether acids and salts of this type are known. When L is an alkylene group selected from —$CX(R^2)$—, wherein $R^2$ is fluorine or perfluoromethyl and X is hydrogen or fluorine, the compound can be made, for example, by hydrolysis of perfluoro-2-alkoxypropionyl fluoride intermediates prepared by reacting alkanoic acid fluorides with hexafluoropropylene oxide as disclosed in U.S. Pat. No. 3,291,843 to Fritz and Selman for use in perfluoro(alkyl vinyl ether) manufacture. When L is -$CZ_2CZ_2$-, wherein Z is independently selected from hydrogen or fluorine, routes to making such compounds are generally described In U.S. Pat. No. 2,713,593 (Brice et al.) where fluoro(alkoxypropionic) acids and derivatives are obtained in useful yields from corresponding hydrocarbon alkoxypropionic acids and derivatives by electrochemical fluorination. Fully fluorinated and partially fluorinated products can be separated for example by fractional distillation. Useful teachings for synthesis can also be found in EP 0 148 482 B1 (Ohsaka et al.) for partially fluorinated propoxy propionic acid fluoride which may be further fluorinated or perfluorinated by electrofluorinating the acid fluoride which is then easily converted to an acid or salt.

In accordance with another preferred form of the invention, L in Formula (I) is an alkylene group selected from —CF($CF_3$)—, —$CF_2$—, —$CF_2CF_2$—, —$CHFCF_2$—, and —$CF_2CHF$—.

The fluorosurfactant used in accordance with the invention may be a diether if R1 or L contains ether linkages. Such compounds are made, for example, by the teachings in WO 01/46116 A1 (Hintzer et al.). Preferred fluoroether acids or salts are fluoromonoethers where $R^1$ and L do not contain ether linkages.

In accordance with another preferred form of the invention, R¹ in Formula (I) is a linear partially or fully fluorinated alkyl group having 2 to 3 carbon atoms. Preferably, R¹ is fully fluorinated.

In accordance with another preferred form of the invention, the fluorosurfactant is highly fluorinated. "Highly fluorinated" in reference to fluorosurfactant means that at least about 50% of the total number of univalent atoms bonded to carbon in the fluorosurfactant are fluorine atoms. More preferably, at least about 75% of the total number of univalent atoms bonded to carbon atoms in the fluorosurfactant are fluorine atoms, most preferably at least about 90%. Perfluorinated surfactants are also preferred for use in accordance with the invention.

In accordance with one preferred embodiment of the invention, the fluorosurfactant is a compound of the formula:

$$[CF_3CF_2CF_2OCF(CF_3)COO^-]Y^+ \qquad (II)$$

wherein $Y^+$ is hydrogen, ammonium, or alkali metal cation. This compound is represented by Formula (I) wherein R¹ is $CF_3CF_2CF_2-$; L is $-CF(CF_3)-$; A⁻ is carboxylate; and $Y^+$ is hydrogen, ammonium or alkali metal cation. Preferably, A⁻ is hydrogen or ammonium. A compound of this formula can be obtained from the perfluoro-2-propoxypropionyl fluoride intermediate prepared according to U.S. Pat. No. 3,291,843 or by dimerization of hexafluoropropylene oxide and subsequent hydrolysis of the resulting acid fluoride to carboxylic acid in the case of the acid and, in the case of the salt, by simultaneous or subsequent reaction with the appropriate base to produce the desired salt. A procedure for dimerization of hexafluoropropylene oxide is disclosed in G.B. Patent 1,292,268.

In accordance with another preferred embodiment of the invention, the fluorosurfactant is a compound of the formula:

$$[CF_3CF_2OCF(CF_3)COO^-]Y^+ \qquad (III)$$

wherein $Y^+$ is hydrogen, ammonium, or alkali metal cation. A compound of this formula can be obtained from the perfluoro-2-ethoxypropionyl fluoride intermediate prepared according to U.S. Pat. No. 3,291,843 and subsequent hydrolysis of the resulting acid fluoride to carboxylic acid in the case of the acid and, in the case of the salt, by simultaneous or subsequent reaction with the appropriate base to produce the desired salt.

In accordance with other embodiments of the invention, the fluorosurfactant is a compound of the formula:

$$[C_2F_5OCF_2CF_2CF_2COO^-]Y^+ \qquad (IV)$$

$$[C_3F_7OCF_2COO^-]Y^+ \qquad (V)$$

$$[C_3F_7OCF_2CF_2COO^-]Y^+ \qquad (VI)$$

$$[C_3F_7OCF_2CF_2CF_2COO^-]Y^+ \qquad (VII)$$

wherein $Y^+$ is hydrogen, ammonium, or alkali metal cation. These compounds can be made, for example, by the procedures described in U.S. Patent Publication 2007/0015864 (Hintzer et al.).

In accordance with another embodiment of the invention, the fluorosurfactant is a compound of Formula (I) wherein n is 0; R¹ and L collectively comprises a perfluoroalkyl group having 4-6 carbons; and A⁻ is sulfonate and sulfonamide anion. In a preferred embodiment of this form of the invention, A⁻ is sulfonamide anion, the sulfonamide compound of Formula (VIII) below:

$$[C_4F_9SO_2N^-CH_2CH_2OH]Y^+ \qquad (VIII)$$

wherein $Y^+$ is hydrogen, ammonium, or alkali metal cation. A surfactant of this formula as the ammonium salt is available commercially from 3M under the trademark NOVEC™ 4200.

In accordance with another embodiment of the invention, the fluorosurfactant is a compound of the formula:

$$[CF_3CF_2CF_2CF_2CH_2CH_2SO_3^-]Y^+ \qquad (IX)$$

wherein $Y^+$ is hydrogen, ammonium, or alkali metal cation.

As discussed in more detail in the description of the process hereinafter, the surfactant is typically not needed in the first step of the polymerization which provides dispersed particulate of fluorinated ionomer. However, if surfactant is used in connection with the first polymerization step, it can be added to the aqueous polymerization medium prior to, during and/or subsequent to the first step of the polymerization. In preferred embodiments of the invention, surfactant is present during the second polymerization step. In one preferred embodiment, the surfactant is supplied in salt form. If the surfactant is supplied as the corresponding acid, conversion to salt can be accomplished by adding ammonium hydroxide or alkali metal hydroxide, preferably ammonium hydroxide, to a solution of the acid in a quantity sufficient to substantially completely convert the acid to salt form prior to adding the surfactant to the aqueous polymerization medium. Alternatively the surfactant supplied in acid form can be added to the aqueous polymerization medium and subsequently converted to salt form.

Initiators

Polymerization in accordance with the invention employs free radical initiators capable of generating radicals under the conditions of polymerization. As is well known in the art, initiators for use in accordance with the invention are selected based on the type of fluoropolymer and the desired properties to be obtained, e.g., end group type, molecular weight, etc. For some fluoropolymers such as melt-processible TFE copolymers, water-soluble salts of inorganic peracids are employed which produce anionic end groups in the polymer. Preferred initiators of this type have a relatively long half-life at the temperature of polymerization, preferably persulfate salts, e.g., ammonium persulfate or potassium persulfate. To shorten the half-life of persulfate initiators, reducing agents such as ammonium bisulfite or sodium metabisulfite, with or without metal catalyst salts such as iron, can be used. Preferred persulfate initiators are substantially free of metal ions and most preferably are ammonium salts.

For the production of PTFE or modified PTFE dispersions for dispersion end uses, small amounts of short chain dicarboxylic acids such as succinic acid or initiators that produce succinic acid such as disuccinic acid peroxide (DSP) are preferably also added in addition to the relatively long half-life initiators such as persulfate salts. Such short chain dicarboxylic acids are typically beneficial in reducing undispersed polymer (coagulum). For the production of PTFE dispersion for the manufacture of fine powder, a redox initiator system such as potassium permanganate/oxalic acid is often used.

In both the first and second polymerization steps of the process of the invention, the initiator is added to the aqueous polymerization medium in an amount sufficient to initiate and maintain the polymerization reaction at a desired reaction rate. At least a portion of the initiator is preferably added at the beginning of each polymerization step. A variety of modes of addition may be used including continuously throughout the polymerization, or in doses or intervals at predetermined times during the polymerization. A particularly preferred mode of operation is for initiator to be precharged to the reactor and additional initiator to be continuously fed into the reactor as the polymerization proceeds. Preferably, total amounts of ammonium persulfate and/or potassium persulfate employed during the course of polymerization are about 25 ppm to about 250 ppm based on the weight of the aqueous medium. Other types of initiators, for example, potassium permanganate/oxalic acid initiators, can be employed in amounts and in accordance with procedures as known in the art.

Chain Transfer Agents

Chain-transfer agents may be used in a process in accordance with the invention for the polymerization of some types of polymers, e.g., for melt-processible TFE copolymers, to decrease molecular weight for the purposes of controlling melt viscosity. If use, chain-transfer agents are primarily used in the second polymerization step of the process. Chain transfer agents useful for this purpose are well-known for use in the polymerization of fluorinated monomers. Preferred chain transfer agents include hydrogen, aliphatic hydrocarbons, halocarbons, hydrohalocarbons or alcohol having 1 to 20 carbon atoms, more preferably 1 to 8 carbon atoms. Representative preferred examples of such chain transfer agents are alkanes such as ethane, chloroform, 1,4-diiodoperfluorobutane and methanol.

The amount of a chain transfer agent and the mode of addition depend on the activity of the particular chain transfer agent and on the desired molecular weight of the polymer product. A variety of modes of addition may be used including a single addition before the start of polymerization, continuously throughout the polymerization, or in doses or intervals at predetermined times during the polymerization. The amount of chain train transfer agent supplied to the polymerization reactor is preferably about 0.005 to about 5 wt %, more preferably from about 0.01 to about 2 wt % based upon the weight of the resulting fluoropolymer.

Process

The first step of the polymerization process, the in situ formation of fluorinated ionomer particulate, can be carried out as a batch process in a pressured reactor of the type known for use in the dispersion polymerization of fluoropolymers. Suitable vertical or horizontal reactors for carrying first step of the process of the invention are equipped with stirrers for the aqueous medium to provide sufficient contact of gas phase monomers such as TFE for desirable reaction rates and uniform incorporation of the comonomer with the ionic group. The reactor preferably includes a cooling jacket surrounding the reactor so that the reaction temperature may be conveniently controlled by circulation of a controlled temperature heat exchange medium.

In a typical process, the reactor is first charged with deionized and deaerated water of the polymerization medium and, if used, some or all of the surfactant to be employed may be added. Although surfactant may be added for the first polymerization step, surfactant is typically not needed because the ionic character of the fluorinated ionomer particulate stabilizes the particulate as it is formed in the dispersion. The comonomer having the ionic group, e.g., PDMOS, can be precharged and/or fed into the reactor as the polymerization proceeds. The reactor is pressurized with TFE and free-radical initiator solution such as ammonium persulfate solution is then added. The temperature is increased and, once polymerization begins, additional TFE is added to maintain the pressure. The start of polymerization in the first polymerization step is referred to as the first kickoff and is defined as the point at which gaseous monomer feed pressure is observed to drop substantially, for example, about 5-10 psi (about 35-70 kPa). Comonomer can also be added as the polymerization proceeds. For some polymerizations, additional monomers, and initiator may be added during the polymerization. Chain transfer agent can be used if desired but typically is not needed for in situ formation of the fluorinated ionomer particulate. The first step of the polymerization is generally short in duration to provide the desired small particle size in the aqueous dispersion of fluorinated ionomer particulate produced.

If solvents are present in the aqueous medium in the first polymerization step, they should be non-telogenic or, if telogenic, used in small amounts so that they do not interfere with either the first or second steps of the polymerization. Preferably, the aqueous dispersion of fluorinated ionomer particulate produced is a "water only" dispersion meaning the aqueous dispersions contain a liquid medium which contains either no other solvent other than water or, if solvents are present, no more that about 1 wt %, of such solvents. Surfactants, if used, are not considered as solvents for the purposes determining whether a aqueous dispersion medium is "water only". Preferably, surfactants are not employed and are not present in the water only dispersion of fluorinated ionomer particulate.

In some embodiments of the process of the invention, it is desirable for a certain number or concentration of fluorinated ionomer particles to be formed in the dispersed fluorinated ionomer particulate in the first polymerization step. Under given reactions, the amount of the comonomer having the ionic group, e.g., PDMOS, which is precharged can be used to control the number of particles or concentration in the fluorinated ionomer particulate formed.

In one form of the invention, the process includes suspending the first polymerization step prior to beginning of the second polymerization step. Suspending the process can effectively separate the first and second steps of the process so that fluoropolymer formed in the second step does not incorporate significant quantities of residual monomers from the first. When the first and second steps are carried out in the same reaction vessel, suspending the process can be carried out by stopping the TFE and initiator feeds, stopping agitation, and venting the reactor. Alternatively, if it is desired or acceptable for the some of the monomers of the first polymerization step be incorporated into the fluoropolymer formed at the beginning of the second polymerization step, i.e., providing gradual change from the fluorinated ionomer to the fluoropolymer to be produced, the first and second polymerization steps can be carried out without suspending the process between the steps.

Suspending the process prior to the beginning of the first and second steps also allows the dispersed ionomer particulate to be analyzed for particle size, concentration, or other properties which may be needed or useful for control of or operation of the second polymerization step. For example, it may be desirable to adjust the concentration and/or remove some of the dispersed ionomer particulate for the purposes of controlling the number of particles formed in the second polymerization step.

In one embodiment of the invention, the suspending of the process includes storing the dispersed particulate of fluorinated ionomer made in the first polymerization step in a separate vessel. In this embodiment of the invention, it is often preferable for the first polymerization step to produce sufficient dispersed fluorinated ionomer particulate to carry out the second polymerization step multiple times, i.e., a batch of dispersed fluorinated ionomer is made which is sufficiently large that it can be used for multiple fluoropolymer polymerizations. In this embodiment of the invention, different batch sizes and/or different pressurized reactors can be used which match the volume of dispersions to be produced in the first and second steps.

The second polymerization step of the process can be carried out in the same type of reactor as discussed for the first step of the process. If the process is carried out in the same reactor, the aqueous polymerization medium may be partially or entirely provided by the aqueous dispersion of fluorinated ionomer particulate. If not already present and if desired for use in the process, surfactant may be added. Additional deionized and deaerated water may be added. Alternatively, reactor may be charged with a dispersion of fluorinated ionomer particulate from a previously made batch of aqueous dispersion of fluorinated ionomer particulate and deionized and deaerated water and surfactant added (if used) to provide the desired concentration of fluorinated ionomer particulate in the polymerization medium.

Therefore, in reference to the present invention, the term in situ in connection with polymerization of the fluorinated ionomer means that the dispersed particulate of fluorinated ionomer formed in the first polymerization step is employed in the second polymerization step of the process. Typically, the same aqueous medium from dispersed particulate from the first polymerization step will form at least part of the aqueous medium employed in the second polymerization step. It will be understood, however, that the use of the term in situ is not intended to mean that the first and second polymerization steps are necessarily carried out in the same reactor or, if the process is suspended between the first and second polymerization steps, to place any time limits on such suspension.

For the production of PTFE homopolymer and modified PTFE, paraffin wax as stabilizer is often added to the reactor. A suitable procedure for PTFE homopolymer and modified PTFE includes first pressurizing the reactor with TFE. If used, the comonomer such as HFP or perfluoro (alkyl vinyl ether) is then added. A free-radical initiator solution such as ammonium persulfate solution is then added. For PTFE homopolymer and modified PTFE, a second initiator which is a source of succinic acid such as disuccinyl peroxide may be present in the initiator solution to reduce coagulum. Alternatively, a redox initiator system such as potassium permanganate/oxalic acid is used. The temperature is increased and, once polymerization begins, additional TFE is added to maintain the pressure. When the process is suspended prior to the second polymerization step, the beginning of polymerization in the second polymerization step may be referred to as the second kickoff and is defined as the point at which gaseous monomer feed pressure is observed to drop substantially, for example, about 5-10 psi (about 35-70 kPa). If the process is not suspended between the first and second polymerization steps, the process will not have a second kickoff. Comonomer and/or chain transfer agent can also be added as the polymerization proceeds in the second polymerization step. For some polymerizations, additional monomers, surfactant and/or initiator may be added during the polymerization.

Batch dispersion polymerizations can be described as proceeding in two phases. The initial period of the reaction can be said to be a nucleation phase during which a given number of particles are established. Subsequently, it can be said that a growth phase occurs in which the predominant action is polymerization of monomer on established particles with little or no formation of new particles. The transition from the nucleation to the growth phase of polymerization occurs smoothly, typically between about 4 and about 10 percent solids in the polymerization of TFE.

The use of fluorinated ionomer in accordance with the invention generally provides sufficient nucleation for the polymerization process and additional nucleating agents are not required. It is not necessary for stabilizing surfactants, if used, to provide additional nucleation although surfactants capable of effective nucleation may be used if desired. In accordance with one embodiment of the present invention, the number of dispersed fluorinated ionomer particles in the particulate introduced into the polymerization medium is preferably selected to control the number of particles formed during the second step of the process. Preferably, the fluorinated ionomer particulate in the aqueous polymerization medium provides a number of dispersed fluorinated ionomer particles within about 15% of the number of fluoropolymer particles produced by polymerizing the fluorinated monomer. More preferably, the number of dispersed fluorinated ionomer particles is within about 10% of the number of fluoropolymer particles produced by polymerizing, more preferably, the number of dispersed fluorinated ionomer particles is within about 5% of the number of fluoropolymer particles produced by polymerizing. Most preferably, the number of dispersed fluorinated ionomer particles is approximately equal to the number of fluoropolymer particles produced by polymerizing. The amount of fluoropolymer particulate to be employed in a process in accordance with the invention may be determined by estimating the number of fluoropolymer particles to be produced in the process based on particle size and solids content and employing an amount of fluorinated ionomer particulate which provides approximately the same number of particles. If other nucleating agents are also employed in the polymerization, it may be desirable to employ a smaller number of particles of fluorinated ionomer particulate. Typical concentrations of dispersed fluorinated ionomer particulate are about $1 \times 10^{16}$ particles per liter to about $1 \times 10^{20}$ particles per liter.

Preferably, the amount of fluorinated ionomer particulate provided in the aqueous polymerization medium comprises less than about 15 weight % of the fluoropolymer solids to be produced in the process. In more preferred embodiments the amount of fluorinated ionomer particulate provided in the aqueous polymerization medium comprises less than about 10 wt %, and even more preferably less than about 1 wt %, still more preferably about 0.1 wt % of the fluoropolymer solids to be produced in the process and most preferably less than 0.025 wt % of the fluoropolymer solids.

If used, the amount of surfactant employed is dependent upon the desired solids content for the polymerization, the type of surfactant, the type of fluoropolymer being produced, reactor design, etc. The amounts employed can be similar to the amounts employed in conventional polymerizations which do not employ fluorinated ionomer particulate. Typical amounts are about 0.01 wt % to about 1 wt % based on the weight of water in the polymerization medium. When a surfactant is used which is capable of effective nucleation, the amount employed typically will be less than the amount employed in a conventional polymerization without the use of fluorinated ionomer particulate.

The solids content of the dispersion upon completion of polymerization can be varied depending upon the intended use for the dispersion. The solids content of fluoropolymer dispersion produced by the process of the invention is preferably at least about 10 wt %. More preferably, the fluoropolymer solids content is at least about 20 wt %. A preferred range for fluoropolymer solids content produced by the process is about 20 wt % to about 65 wt %, even more preferably about 20 wt % to about 55 wt %, most preferably, about 35 wt % to about 55 wt %.

After batch completion (typically several hours) when the desired amount of polymer or solids content has been achieved, the feeds are stopped, the reactor is vented and purged with nitrogen, and the raw dispersion in the vessel is transferred to a cooling vessel.

In a preferred process of the invention, polymerizing produces less than about 13 wt %, more preferably less than about 10 wt %, still more preferably less than 3 wt %, even more preferably less than 1 wt %, most preferably less that about 0.5 wt % of undispersed fluoropolymer (coagulum) based on the total weight of fluoropolymer produced.

In one embodiment of the invention, the aqueous dispersion of fluoropolymer particles has a raw dispersion particle size (RPDS) of from about 10 to about 400 nm, preferably 100 to 350 nm.

The as-polymerized dispersion can be stabilized with anionic, cationic, or nonionic surfactant for certain uses. Typically, however, the as-polymerized dispersion is transferred to a dispersion concentration operation which produces concentrated dispersions stabilized with nonionic surfactants by known methods. Aromatic alcohol ethoxylates as taught in Marks et al., U.S. Pat. No. 3,037,953, and in Holmes, U.S. Pat. No. 3,704,272 can be used as stabilizers. Aliphatic alcohol ethoxylates such as those disclosed in Marks et al., U.S. Pat. No. 3,037,953 and Miura et al., U.S. Pat. No. 6,153,688 are preferably used in concentrated dispersions stabilized with nonionic surfactants. Particularly preferred nonionic surfactants are a compound or mixture of compounds of the formula:

$$R(OCH_2CH_2)_nOH$$

wherein R is a branched alkyl, branched alkenyl, cycloalkyl, or cycloalkenyl hydrocarbon group having 8-18 carbon atoms and n is an average value of 5 to 18 as disclosed in Cavanaugh EP 1472307 A1. The stabilized dispersion preferably contains 2-11 wt % nonionic surfactant based on the weight of fluoropolymer solids in the dispersion. Solids content of concentrated dispersion is typically about 35 to about 70 wt %.

Certain grades of PTFE dispersion are made for the production of fine powder. For this use, the as-polymerized dispersion is not stabilized or concentrated and instead is coagulated, the aqueous medium is removed and the PTFE is dried to produce fine powder.

The dispersion polymerization of melt-processible copolymers is similar to PTFE and modified PTFE polymerizations except that comonomer in significant quantity is added to the batch initially and/or introduced during polymerization. Chain transfer agents are typically used in significant amounts to decrease molecular weight, i.e., to increase melt flow rate. The same dispersion concentration operation can be used to produce stabilized concentrated dispersions. Alternatively, for melt-processible fluoropolymers used as molding resin, the dispersion is coagulated and the aqueous medium is removed. The fluoropolymer is dried then processed into a convenient form such as flake, chip or pellet for use in subsequent melt-processing operations.

The process of the invention may also be carried out as a continuous process in a pressurized reactor. A continuous process is especially useful for the manufacture of fluorocarbon elastomers.

In order to improve reaction rate and yield of such a continuous polymerization process, the fluorinated ionomer particulate polymerized in situ may optionally be modified subsequent to its polymerization in a batch or semi-batch process wherein a small amount of fluoromonomer(s) (i.e. preferably less than 10% of the total quantity of said monomers to be polymerized in the subsequent continuous polymerization, more preferably less than 1%, most preferably less than 0.1%) are polymerized onto the ionomer particulate. This modified particulate is then introduced into the continuous polymerization process for manufacture of fluoropolymer at improved rates and yields.

Polymerization Products

The invention provides particles comprising a bulk of fluoropolymer and a nucleus of fluorinated ionomer. As used in this application, the term "nucleus" means an interior portion of the particle about which fluoropolymer growth takes place as the particle is formed. Such particles are preferably provided as an aqueous dispersion wherein the particles have a number average particle size of about 10 nm to about 400 nm. It is preferred for the particles to comprise less than about 15 wt % fluorinated ionomer. In more preferred embodiments, the particles comprise less than about 10 wt %, and even more preferably less than about 1 wt %, still more preferably about 0.1 wt %, and most preferably less than 0.025 wt % of fluorinated ionomer.

In preferred forms of the invention, the fluoropolymer of the particles is a homopolymer or copolymer of at least one fluorinated monomer selected from the group consisting of tetrafluoroethylene (TFE), hexafluoropropylene (HFP), chlorotrifluoroethylene (CTFE), trifluoroethylene, hexafluoroisobutylene, perfluoroalkyl ethylenes, fluorovinyl ethers, vinyl fluoride (VF), vinylidene fluoride (VF2), perfluoro-2,2-dimethyl-1,3-dioxole (PDD), perfluoro-2-methylene-4-methyl-1,3-dioxolane (PMD), perfluoro(allyl vinyl ether) and perfluoro(butenyl vinyl ether). In one embodiment, the fluoropolymer comprises polytetrafluoroethylene or modified polytetrafluoroethylene having a comonomer content of no greater than about 1 wt %. In another embodiment, the fluoropolymer comprises melt-processible copolymer comprising at least about 60-98 wt % tetrafluoroethylene units and about 2-40 wt % of at least one other monomer. In yet another embodiment, the fluoropolymer comprises fluorocarbon elastomer. Preferred fluorocarbon elastomer comprises copolymers comprising 25 to 70 wt %, based on total weight of the fluorocarbon elastomer, of copolymerized units of a first fluorinated monomer selected from the group consisting of vinylidene fluoride (VF2), tetrafluoroethylene (TFE), and mixtures thereof.

Particles in accordance with the invention comprising a bulk of fluoropolymer and a nucleus of fluorinated ionomer and dispersions thereof can be employed generally in the same manner as conventional fluoropolymer particles and dispersions.

In accordance with one form of the invention, articles are formed from the particles of the invention. When in the form of fine powder, the fluoropolymer is commonly converted to useful articles by a lubricated extrusion (paste extrusion) process. In paste extrusion, the resin is blended with a lubricant and shaped by an extrusion process. After extrusion, the lubricant is removed, and the resultant green shape is fused (sintered) at temperature above the melting point of the PTFE. Articles formed from fine powder resin include paste extruded tubing, wire and cable coatings and sheet or tape. Another article is expanded PFTE films which are made from paste extruded shapes that are rapidly stretched in the unsintered state to form film that is porous to water vapor but not to condensed water, and is useful in material for garments, tenting, separatory membranes, and the like.

In accordance with another form of the invention, articles are formed form melt processable fluoropolymers such as PFA and FEP. Such articles are commonly fabricated by melt extrusion to create coverings for wire and cable, tubing and pipe. Film can be formed by casting the extruded molten film onto a chilled roller. Thin film can be formed by the film blowing technique. In making blown film, molten polymer is continuously extruded upward from a circular die to form a film tube. The film tube is rapidly expanded by internal pressure while the film is still molten and then, at a height above the die where the polymer has cooled and solidified, is nipped or slit and wound up. Small parts can be fabricated by injection molding; these parts can include shapes of considerable complexity that do not require further shaping by machining. Larger shapes can be fabricated by the transfer molding technique, in which an aliquot of resin from a reservoir or "pot" of molten polymer is injected by a plunger into a preheated mold.

In accordance with another form of the invention, coatings are formed from the particles of the invention whether applied as powders or dispersed in water or organic solvents or a mixture thereof.

In yet another form of the invention, an article is provided having a coating formed from an aqueous dispersion of the particles of the invention. Coated articles include cookers and frypans, oven liners, glass fabric and the like. Other coated articles include valves, wire, metal foil, shoe molds, snow shovels and plows, ship bottoms, chutes, conveyors, dies, tools, industrial containers, molds, lined reactor vessels, automotive panels, heat exchangers, tubing, and the like. Coated articles also include o-rings, gaskets, seals, beading, windshield wipers, and automotive window and door seals, rubber rolls for photocopiers and laser printers including fuser and pressure rolls, rubber belts for photocopiers, and the like. Coated articles further include shower doors, oven and microwave glass, lenses, head lamps, mirrors, automobile windshields, cathode ray tubes such as used in television sets and computer monitors, laboratory glassware, and vials for pharmaceuticals. Additionally, coated articles include flat panel displays such as liquid crystal displays and light emitting diodes, photoconductor rolls for photocopiers and laser printers, electronic devices wherein coatings are interlayer dielectrics, photomasks, and the like. Moreover, coated articles include statuary, architectural panels and buildings, and the like.

Test Methods

Melt Flow Rate (MFR) of the Fluorinated Ionomer is measured on the polymer in thermoplastic form, e.g., the sulfonyl fluoride or sulfonic acid form for sulfonate ionomers, according to the method of ASTM D-1238-04c at 270° C. with a 2110 gram weight.

Fluorinated Ionomer Particulate Size, Weight Average, is measured by dynamic light scattering (DLS). Dispersions of the ionomers were diluted from 10× to 100× (vol:vol), but typically 30×, into a dispersant of dimethyl sulfoxide with additives of 0.1 wt % (solids basis) of Zonyl® 1033D ($C_6F_{13}CH_2CH_2SO_3H$) surfactant and 0.23 wt % ethyldiisopropylamine, which neutralized the Zonyl® and the ionomer end groups to trialklyammonium forms. This dispersant mixture was called "DMSOZE". The diluted dispersion was filtered through a 1.0 um graded density glass micro fiber syringe filter (Whatman PURADISC® #6783-2510) into a disposable polystyrene cuvette. Dynamic light scattering (DLS) was measured at 25° C. using a Malvern Instruments Nano S, which measures scattered light from a HeNe laser at 633 nm at a scattered angle of 173° (close to backscattered). The automated instrument chooses how many 10 s runs make up each measurement (generally 12 to 16), and for each sample ten measurements were performed, the entire process taking usually ~30 min. For concentrated or highly scattering samples, the instrument may move the focal point of the laser close to the front of the cuvette, minimizing the path length through the sample and thus reducing particle-particle scattering artifacts. However, for almost all the fluorinated ionomer dispersion samples analyzed here, the instrument chose to use a focal position of 4.65 mm, which maximized the path in the cell and enhanced detection of the weak scattering. In addition, the instrument adjusts an attenuator to maintain the count rate in an optimum range. The attenuator settings were 11, 10, or 9, which correspond to light attenuation factors of X1.00 (no attenuation), X0.291, or X0.115, respectively. Various numeric and graphical outputs are available from the Malvern software. The simplest and most robust is the "z-average" particle diameter, calculated from the z-average diffusion coefficient made by a cumulants fit to the autocorrelation function. The name z-average has been used in analogy to the z-average molecular weight Mz, in that the DLS z-average particle size is derived from a distribution of diffusion coefficients weighted by the square of the particle mass $M_i^2$. Half of the scattered light Intensity is produced by particles with diameters larger than D(I)50. Using the input refractive index of the particles, dispersant index, wavelength, and scattering angle, the software uses a Mie calculation to convert the intensity distribution to a weight distribution. The weight average diameter is that diameter at which half of the mass of the particles in the sample have a larger diameter and half have a smaller diameter.

Dry coagulum amount is measured by physically collecting the wet polymer that coagulates during the course of the polymerization and then drying this coagulum overnight at 80° C. and a vacuum of 30 mm Hg (4 kPa). The dried coagulum is weighed and the Weight Percentage of Undispersed Polymer (Coag. wt %) is determined based on the total weight of fluoropolymer in the dispersion.

Transition Temperatures of Fluoropolymers by Differential Scanning Calorimetry (DSC) is measured according to ASTM D 3418-03.

Melt Flow Rate (MFR) of the Fluoropolymer Produced in the Process is measured according to ASTM D-1238-94a following the detailed conditions disclosed in U.S. Pat. No. 4,952,630 at 372° C.

Comonomer content (PPVE) is measured by FTIR according to the method disclosed in U.S. Pat. No. 4,743,658, col. 5, lines 9-23.

Weight % Fluorinated Ionomer in Fluoropolymer Dispersion Particles (FI Nucleus) is calculated by dividing the weight of dispersed fluorinated ionomer particulate produced in the first polymerization step and present in the reactor for the second polymerization step by the total weight of fluoropolymer in the dispersion produced in the second polymerization step.

Fluoropolymer Particle size, i.e., raw dispersion particle size (RDPS) is determined by laser diffraction techniques that measure the particle size distributions (PSD) of materials using a Microtrac Ultrafine Particle Analyzer (UPA). The UPA uses dynamic light scattering principle for measuring PSD with size range of 0.003 micron to 6.54 micron. The samples were analyzed after collecting the background with water. The measurements were repeated three times and averaged.

Perfluoroalkane Carboxylic Acid Or Salt Fluorosurfactant Content is measured by a GC technique in which the fluorosurfactant is esterified with acidic methanol. Perfluoroheptanoic acid is used as an internal standard. Upon addition of electrolyte and hexane the ester is extracted into the upper hexane layer. The hexane layer is analyzed by injection onto a glass GC column of 20 ft.×2 mm I.D. packed with 10% OV-210 on 70/80 mech Chromosorb W.AW.DMCS. held at 120 C. The detector is ECD and the carrier gas of 95% argon/5% methane has a flow rate of 20 to 30 ml/min.

EXAMPLE

Surfactant

For use in Example 1 below, the surfactant: $C_3F_7OCF(CF_3)COONH_4$ (HFPO dimer acid salt, DAS), 20 wt %, is prepared by dropwise addition of 128 g of concentrated ammonium hydroxide solution to 500 g of $C_3F_7OCF(CF_3)COOH$ and subsequent dilution with deionized water to 20 wt %.

Example 1

Core-Shell Polymerization

With In Situ Formation of Fluorinated Ionomer Particulate and Surfactant

This example demonstrates the polymerization of a core/shell fluoropolymer in the presence of dispersed fluorinated ionomer particulate prepared in situ and short chain surfactant (DAS) where the core comprises a non-melt flowable PTFE and the shell comprises melt-fabricable perfluoropolymer.

First Polymerization Step—In Situ Formation of Dispersed Fluorinated Ionomer Particulate A cylindrical, horizontal, water-jacketed, paddle-stirred, stainless steel reactor having a length to diameter ratio of about 1.5 and a water capacity of 1 gallon (3.8 liter) is charged with 1800 grams of demineralized water, 0.3 grams of a 30% aqueous solution of ammonium perfluoro(3,6-dioxa-4-methyl-7-octenesulfonate (PDMOS), and 20 grams of a 20 wt % aqueous solution of DAS. With the reactor paddle agitated at 110 rpm, the reactor is heated to 25° C. and then evacuated and purged three times with tetrafluoroethylene (TFE). The reactor temperature is increased to 75° C., and is pressured to 100 psig (1.0 MPa) with TFE. Then, 40 ml of freshly prepared aqueous initiator solution containing 0.2% ammonium persulfate (APS) is injected. Then, this same initiator solution is pumped into the reactor at 0.1 ml/min. After polymerization has begun as indicated by a 5 psi (35 KPa) drop in reactor pressure (kickoff), additional TFE is fed into the reactor at a rate of 1 gram/minute. After 10 grams of TFE have been consumed after kickoff, a sample of the reaction medium is taken while continuing the agitation. The sample is a clear dispersion of fluorinated ionomer particulate with a solids content of 0.02%. Weight average particle size of the fluorinated ionomer particulate is approximately 17 nm in diameter. IXR is approximately 17 (EW≅1200).

Second Polymerization Step—Core-Shell Fluoropolymer Polymerization

The TFE pressure is rapidly increased to 300 psig (2.17 MPa), after which the TFE consumption rate is adjusted to 6 grams/minute for 6 minutes (36 additional grams TFE consumed). Then the TFE and initiator feeds are stopped, and the reactor is slowly vented. After stopping agitation, the reactor vapor space is evacuated. Agitation is resumed at 110 rpm and the contents of the reactor are cooled to 25° C. The agitator is again stopped, then the pressure in the reactor is raised to 8 inches Hg (27 KPa) with ethane. After the addition of ethane, the agitator is restarted at 110 rpm and the contents of the reactor are warmed to 75° C. Then 24 ml of PEVE is injected, followed by raising the reactor pressure to 250 psig (1.75 MPa) with TFE. Then, the aqueous initiator solution of 0.2% APS is resumed at 0.5 ml/min for the remainder of the batch. In addition, PEVE is injected at 0.3 ml/min for the remainder of the batch. The TFE feed rate is adjusted to 7.56 g/minute. After 114 minutes (861 additional grams of TFE consumed), the reaction is terminated. At the end of the reaction period, the TFE, PEVE and initiator solution feeds are stopped, and the reactor is slowly vented. After venting to nearly atmospheric pressure, the reactor is purged with nitrogen to remove residual monomer. Upon further cooling, the dispersion is discharged from the reactor at below 60° C. The solids content of the raw dispersion is 32.94 wt % and the raw dispersion particle size (RDPS) is 225 nm. The wt % of fluorinated ionomer in the dispersion particles (FI Nucleus) is calculated to be 0.0095 wt %.

The dispersion is coagulated by freezing and thawing. After coagulation, the polymer is isolated by filtering and then drying in a 150° C. convection air oven. The isolated polymer contains 4% PEVE and has a melt flow rate of 4 g/10 min.

What is claimed is:

1. A process for making an aqueous dispersion of fluoropolymer particles comprising:
  polymerizing in a first polymerization step at least one fluorinated monomer having an ionic group in an aqueous polymerization medium in the presence of initiator, said polymerizing providing dispersed solid particulate of fluorinated ionomer;
  polymerizing in a second polymerization step at least one fluorinated monomer in said aqueous polymerization medium in the presence of said dispersed particulate of fluorinated ionomer and initiator to form the aqueous dispersion of particles of fluoropolymer, said fluoropolymer being nonionomeric fluoropolymer, wherein the amount of said dispersed particulate of fluorinated ionomer present in said aqueous polymerization medium in said second polymerization step comprises less than about 15 wt % of said fluoropolymer solids produced in said aqueous dispersion.

2. The process of claim 1 further comprising suspending said first polymerization step prior to beginning said second polymerization step.

3. The process of claim 2 wherein during said suspending said dispersed particulate of fluorinated ionomer is stored in a separate vessel.

4. The process of claim 1 wherein said first polymerization step produces sufficient dispersed fluorinated ionomer particulate for carrying out said second polymerization step multiple times.

5. The process of claim 1 wherein said particulate of fluorinated ionomer have a weight average particle size of about 2 nm to about 100 nm.

6. The process of claim 1 wherein said fluorinated ionomer is highly fluorinated.

7. The process of claim 1 wherein said fluorinated ionomer is perfluorinated.

8. The process of claim 1 wherein said fluorinated ionomer comprises a polymer backbone with recurring side chains attached to the polymer backbone with the side chains carrying ionic groups.

9. The process of claim 1 wherein said fluorinated ionomer comprises ionic groups having a pKa less than about 10.

10. The process of claim 1 wherein said fluorinated ionomer comprises ionic groups selected from the group consisting of sulfonate, carboxylate, phosphonate, phosphate, and mixtures thereof.

11. The process of claim 1 wherein said fluorinated ionomer comprises sulfonate groups.

12. The process of claim 11 wherein said recurring side chains are represented by the formula —(O—CF$_2$CFR$_f$)$_a$—(O—CF$_2$)$_b$—(CFR'$_f$)$_c$SO$_3$X, wherein R$_f$ and R'$_f$ are independently selected from F, Cl or a perfluorinated alkyl group having 1 to 10 carbon atoms, a=0 to 2, b=0 to 1, c=0 to 6, and X is H, Li, Na, K or NH$_4$.

13. The process of claim 12 wherein said fluorinated ionomer is a copolymer prepared from tetrafluoroethylene and CF$_2$=CF$_2$—O—CF$_2$CF(CF$_3$)—O—CF$_2$CF$_2$—SO$_3$X wherein X is H, Li, Na, K or NH$_4$.

14. The process of claim 1 wherein said fluorinated ionomer in thermoplastic form has a melt flow at 270° C. using a 5 kg weight of about 1 to about 500.

15. The process of claim 1 further comprising providing surfactant in said polymerization medium.

16. The process of claim 1 further comprising providing fluorosurfactant in said polymerization medium.

17. The process of claim 1 further comprising providing fluoroether surfactant in said polymerization medium.

18. The process of claim 16 wherein said fluorosurfactant has the formula:

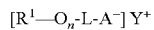
[R$^1$—O$_n$-L-A$^-$] Y$^+$ wherein:
R$^1$ is a linear or branched partially or fully fluorinated aliphatic group which may contain ether linkages;
n is 0 or 1;
L is a linear or branched alkylene group which may be nonfluorinated, partially fluorinated or fully fluorinated and which may contain ether linkages;
A$^-$ is an anionic group selected from the group consisting of carboxylate, sulfonate, sulfonamide anion, and phosphonate; and
Y$^+$ is hydrogen, ammonium or alkali metal cation;
with the proviso that the chain length of R$^1$—O$_n$-L- is not greater than 6 atoms.

19. The process of claim 18 wherein n is 1.

20. The process of claim 19 wherein
R$^1$ is CF$_3$CF$_2$CF$_2$—;
L is —CF(CF$_3$)-; and
A$^-$ is carboxylate; and
Y$^+$ is hydrogen or ammonium.

21. The process of claim 1 wherein said aqueous medium contains less than about 300 ppm of perfluoroalkane carboxylic acid or salt fluorosurfactant having 8 or more carbon atoms based on the weight of water in said aqueous polymerization medium.

22. The process of claim 1 wherein said polymerizing produces less than about 13 wt % undispersed fluoropolymer based on the total weight of fluoropolymer produced.

23. The process of claim 1 wherein said at least one fluorinated monomer is selected from the group consisting of tetrafluoroethylene (TFE), hexafluoropropylene (HFP), chlorotrifluoroethylene (CTFE), trifluoroethylene, hexafluoroisobutylene, perfluoroalkyl ethylenes, fluorovinyl ethers, vinyl fluoride (VF), vinylidene fluoride (VF2), perfluoro-2,2-dimethyl-1,3-dioxole (PDD), perfluoro-2-methylene-4-methyl-1,3-dioxolane (PMD), perfluoro(allyl vinyl ether) and perfluoro(butenyl vinyl ether).

24. The process of claim 1 wherein said polymerizing of said at least one fluorinated monomer produces polytetrafluoroethylene or modified polytetrafluoroethylene having a comonomer content of no greater than about 1 wt %.

25. The process of claim 1 wherein said polymerizing of said at least one fluorinated monomer produces a melt-processible copolymer comprising at least about 60-98 wt % tetrafluoroethylene units and about 2-40 wt % of at least one other monomer.

26. The process of claim 1 wherein said polymerizing of said at least one fluorinated monomer produces a melt-processible copolymer containing functional groups which are precursors for ionic groups.

27. The process of claim 1 wherein said polymerizing of said at least one fluorinated monomer produces a fluorocarbon elastomer.

28. The process of claim 27 wherein said fluorocarbon elastomer copolymers comprise 25 to 70 wt %, based on total weight of the fluorocarbon elastomer, of copolymerized units of a first fluorinated monomer selected from the group consisting of vinylidene fluoride (VF2), tetrafluoroethylene (TFE), and mixtures thereof.

29. The process of claim 1 wherein said fluorinated ionomer has an ion exchange ratio of about 3 to about 53.

* * * * *